(12) United States Patent
D'Antuono

(10) Patent No.: US 11,103,941 B2
(45) Date of Patent: Aug. 31, 2021

(54) HYDRAULIC TOOL

(71) Applicant: Milwaukee Electric Tool Corporation, Brookfield, WI (US)

(72) Inventor: Marc D'Antuono, Whitefish Bay, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/534,541

(22) Filed: Aug. 7, 2019

(65) Prior Publication Data

US 2020/0070262 A1  Mar. 5, 2020

Related U.S. Application Data

(60) Provisional application No. 62/726,013, filed on Aug. 31, 2018.

(51) Int. Cl.
| | | |
|---|---|---|
| *B23B 27/04* | (2006.01) | |
| *B23D 29/00* | (2006.01) | |
| *B25F 5/02* | (2006.01) | |
| *B23D 27/04* | (2006.01) | |
| *B23D 35/00* | (2006.01) | |

(52) U.S. Cl.
CPC ........... *B23D 29/002* (2013.01); *B23D 27/04* (2013.01); *B23D 35/002* (2013.01); *B25F 5/021* (2013.01)

(58) Field of Classification Search
CPC .... B23D 29/002; B23D 27/04; B23D 35/002; B23D 15/14; B25F 5/021
USPC ........................................... 30/228–231, 254
See application file for complete search history.

(56) References Cited

U.S. PATENT DOCUMENTS 2,421,414 A * 6/1947 Ernst .............................. 83/197
9,381,622 B2 * 7/2016 Wason ................... B23D 33/02
(Continued)

FOREIGN PATENT DOCUMENTS

| EP | 0 768 137 | 4/1997 |
| EP | 288 164 | 1/2014 |
| JP | S567620 | 1/1981 |

OTHER PUBLICATIONS

International Search Report and Written Opinion prepared by the European Patent Office in international patent application No. PCT/US2019/046329 dated Dec. 6, 2019.

*Primary Examiner* — Kenneth E Peterson
*Assistant Examiner* — Liang Dong
(74) *Attorney, Agent, or Firm* — Quarles & Brady LLP

(57) ABSTRACT

An example shearing head includes a first member and a second member being rotatable about a pin. The first member has a shearing surface forming a substantially right angle with a first lateral surface of the first member. The second member has a shearing surface forming a substantially right angle with a second lateral surface of the second member. The second member includes a first distal surface and a second distal surface forming a substantially right angle. The first distal surface and the second distal surface are substantially perpendicular to the second lateral surface. The second member includes a third lateral surface opposing the second lateral surface and a retainer is attached to the second member. A first surface of the retainer contacts the first distal surface, a second surface of the retainer contacts the second distal surface, and the third lateral surface contacts a third surface of the retainer.

18 Claims, 11 Drawing Sheets

(56) References Cited

U.S. PATENT DOCUMENTS

| | | | |
|---|---|---|---|
| 2004/0181947 A1* | 9/2004 | Wagner | B23D 17/02 30/228 |
| 2008/0072436 A1* | 3/2008 | Frenken | B23D 17/02 30/175 |
| 2016/0252112 A1* | 9/2016 | Kehoe | B23D 29/00 60/327 |

* cited by examiner

HYDRAULIC TOOL

CROSS REFERENCE TO RELATED APPLICATIONS

The present application claims priority to U.S. provisional application No. 62/726,013 filed Aug. 31, 2018, the contents of which are hereby incorporated by reference in their entirety.

FIELD

The present disclosure relates generally to power tools. More particularly, the present disclosure relates to a handheld shearing power tool.

BACKGROUND

A hydraulic shearing tool can be used to shear a workpiece. For example, the hydraulic shearing tool may be used to snap a multi-stranded steel wire (between 3 and 19 strands wound together) into separate pieces. In such tools, a hydraulic pump is typically utilized for pressurizing hydraulic fluid and transferring it to a cylinder of the tool. This cylinder causes an extendible piston to be displaced towards a shearing head. The piston exerts a force on the shearing head, which typically includes opposed jaws with certain shearing features, depending upon the particular configuration of the tool. In this case, the force exerted by the piston can be used for closing the jaws to perform a shearing action on the work piece at a desired location.

Some shearing tools are configured to shear a particular type of metal wire having one or more layers comprising multiple soft metal strands (e.g., aluminum strands) that surround a hard metal core (e.g., steel). During use, the hard metal core will often resist shearing and exert forces against the jaws. These forces are transverse to the shearing plane of the tool. As such, these shearing tools often have a blade retainer installed on one of the jaws. The blade retainer resists movement of the jaws that is transverse to the shearing plane. Such blade retainers are typically sized and positioned to engage the opposing jaw after shearing of the soft metal sleeve has already been performed. Thus, if the tool is used to shear a similarly sized workpiece that includes a thicker hard metal core, the workpiece generally beings exerting the transverse forces before engagement of the blade retainer, causing the sheared edge to be crooked, or preventing the shearing operation from being completed at all.

Additionally, such blade retainers are typically fastened to a jaw with fasteners such as threaded bolts. If the tool is dropped by a user such that the blade retainer absorbs the impact, the threaded bolts can break due to the absorbed shear forces, and the blade retainer is no longer attached to the jaw.

Therefore, there is a need for a hydraulic shearing tool having a blade retainer that is attached to a jaw of the tool in a drop-resistant manner. There is also a need for a blade retainer that engages the opposing jaw of the shearing tool at an earlier stage of the shearing stroke.

SUMMARY

One aspect of the disclosure is a biased open shearing head for a hydraulic power tool, the shearing head comprising: a pin; a first jaw that is rotatable about the pin, the first jaw comprising: a first actuation member having a first cam surface, wherein the pin passes through the first actuation member, and wherein the first jaw is configured to rotate in response to a force being applied to the first cam surface; and a first shearing member having a first shearing surface that forms a first substantially right angle with a first lateral surface of the first shearing member, the first shearing member being attached to the first actuation member; a second jaw that is rotatable about the pin, the second jaw comprising: a second actuation member having a second cam surface, wherein the pin passes through the second actuation member, and wherein the second jaw is configured to rotate in response to a force being applied to the second cam surface; and a second shearing member having a second shearing surface that forms a substantially right angle with a second lateral surface of the second shearing member, the second shearing member being attached to the second actuation member, wherein the second shearing member includes a first distal surface and a second distal surface that form a substantially right angle, wherein the first distal surface and the second distal surface are substantially perpendicular to the second lateral surface, wherein the second shearing member includes a third lateral surface that is opposite the second lateral surface; an extension spring configured to resist (i) separation of the first cam surface and the second cam surface and (ii) movement of the first shearing surface toward the second shearing surface; and a blade retainer attached to the second shearing member, the blade retainer being configured, during a shearing action, to resist movement of the first shearing member or the second shearing member that is transverse to a shearing plane, wherein a first surface of the blade retainer fixedly contacts the first distal surface, a second surface of the blade retainer fixedly contacts the second distal surface, and the third lateral surface fixedly contacts a third surface of the blade retainer.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1A:
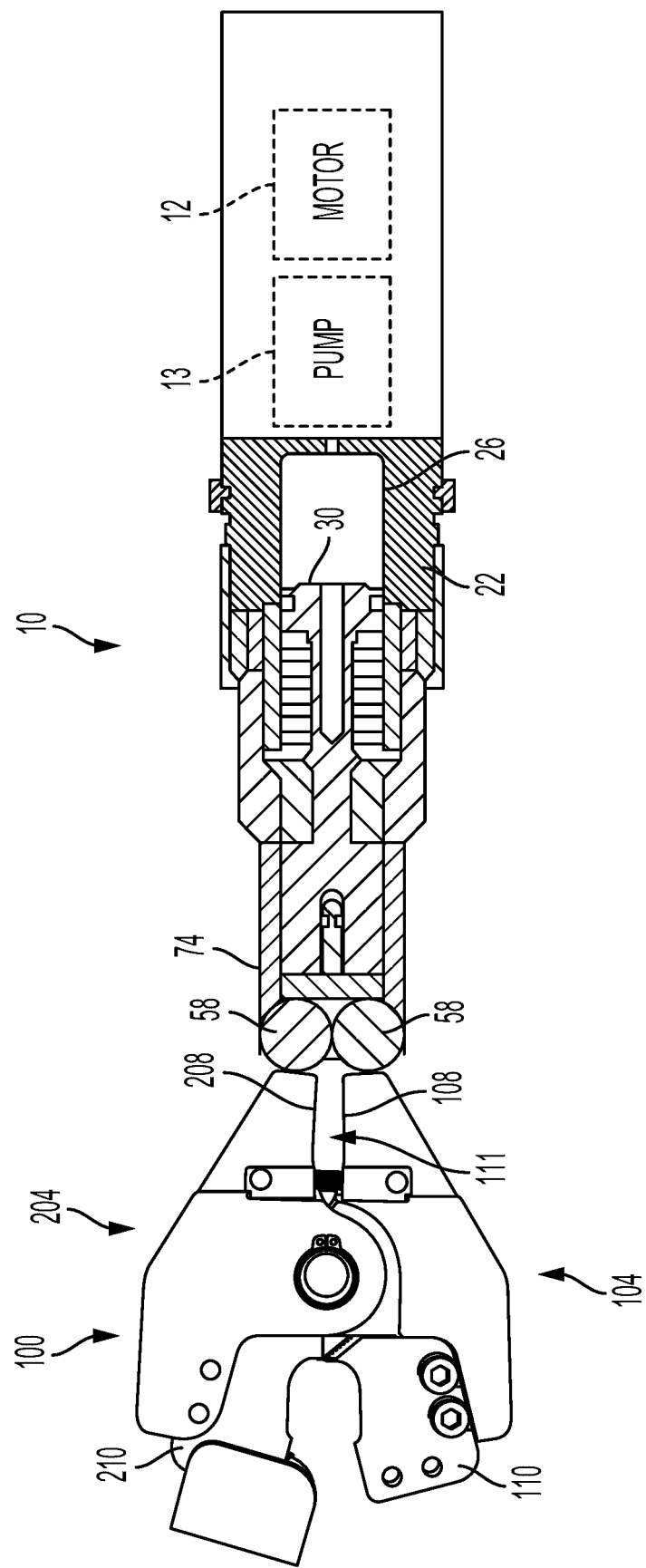
FIG. 1A is a schematic diagram of a hydraulic shearing tool, according to an example.

FIG. 1A illustrates a hydraulic power tool 10 that includes a biased open shearing head 100. The hydraulic power tool 10 includes a shearing head 100, an electric motor 12, a pump 13 driven by the motor 12, and a housing 22 defining a cylinder 26 therein. An extendable piston 30 is disposed within the cylinder 26. The pump 13 can provide pressurized hydraulic fluid to the cylinder 26, causing the piston 30 to extend from the housing 22 to thereby actuate a first jaw 104 and a second jaw 204 of the shearing head 100 for shearing a work piece, such as a guy wire (e.g., zinc-coated steel wire strand ASTM 475).

In operation, the piston 30 moves a set of rollers 58 towards the shearing head 100. (The rollers 58 are not to scale in FIG. 1A). As the set of rollers 58 begins to enter a cavity 111 defined by the first jaw 104 and the second jaw 204, the set of rollers 58 bear against a first cam surface 108 and a second cam surface 208. As the rollers 58 are inserted into the cavity 111, the first shearing member 110 of the first jaw 104 and the second shearing member 210 of the second jaw 204 close (e.g., rotate toward each other).

Figure 1B:
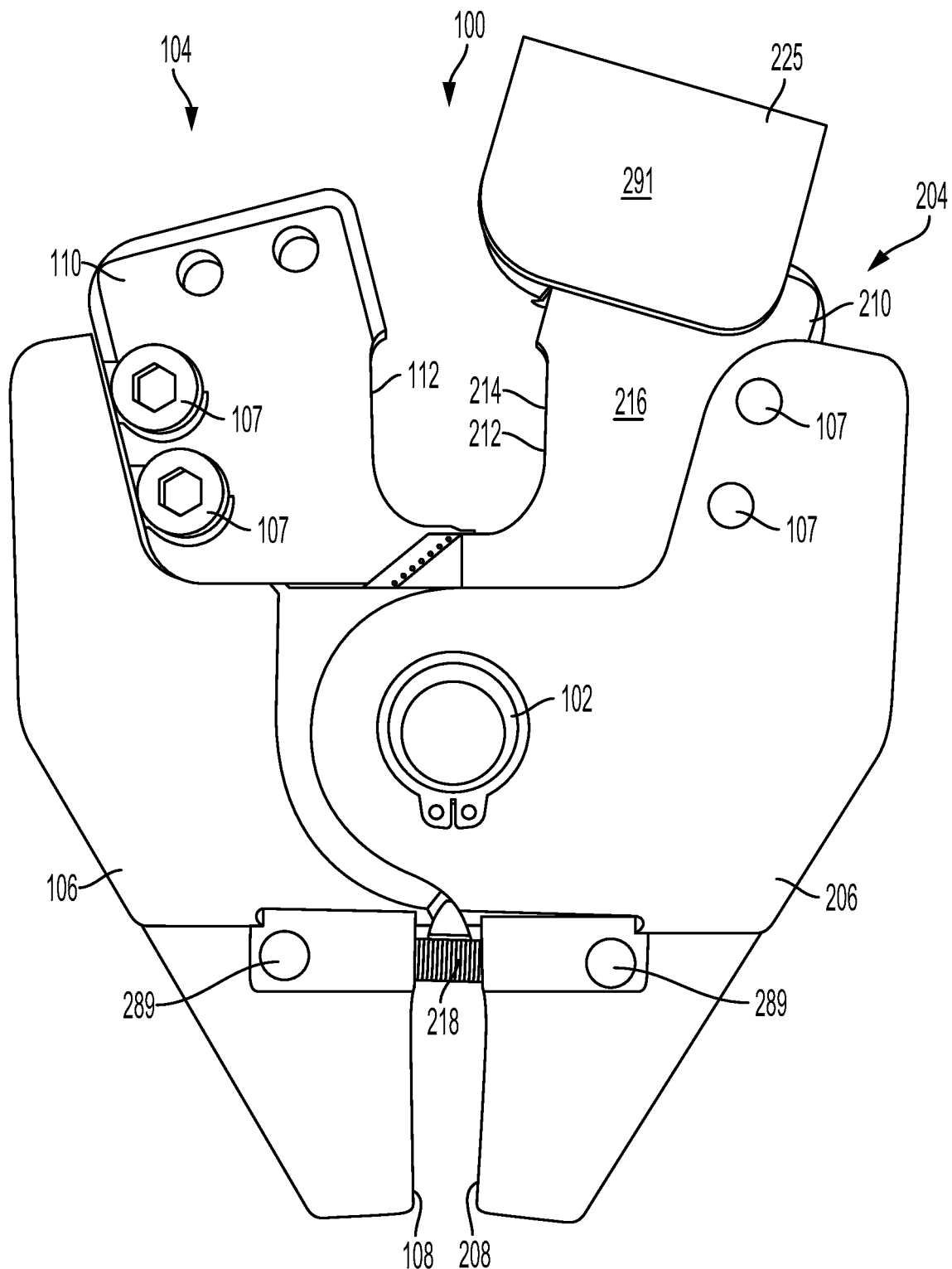
FIG. 1B is a front view of a shearing head, according to an example.

FIG. 1B is a front view of the shearing head 100. The shearing head 100 includes a pin 102 (e.g., a hollow metal tube) and the first jaw 104 (e.g., a metal jaw) that is rotatable about the pin 102. The first jaw 104 includes a first actuation member 106 (e.g., metal) having a first cam surface 108. The pin 102 passes through the first actuation member 106. The first jaw 104 is configured to rotate in response to a (leftward) force being applied to the first cam surface 108. The first jaw 104 also includes a first shearing member 110 (e.g., metal) having a first shearing surface 112 that forms a first substantially right angle 114 with a first lateral surface 116 of the first shearing member 110 (see FIG. 2). The first shearing member 110 is attached to the first actuation member 106 (e.g., threaded holes within the first actuation member 106) via fasteners 107 (e.g., threaded bolts) (see also FIG. 2), such that force applied to the first cam surface 108 is translated to the first shearing member 110.

The shearing head 100 also includes a second jaw 204 (e.g., metal jaw) that is rotatable about the pin 102. The second jaw 204 includes a second actuation member 206 (e.g., metal) having a second cam surface 208. The pin 102 passes through the second actuation member 206. The second jaw 204 is configured to rotate in response to a force being applied to the second cam surface 208. The second jaw 204 also includes a second shearing member 210 (e.g., metal) having a second shearing surface 212 that forms a second substantially right angle 214 with a second lateral surface 216 of the second shearing member 210. The second shearing member 210 is attached to the second actuation member 206 (e.g., threaded holes within the second actuation member 206) via fasteners 107 (e.g., threaded bolts), such that force applied to the second cam surface 208 is translated to the second shearing member 210.

Figure 8:
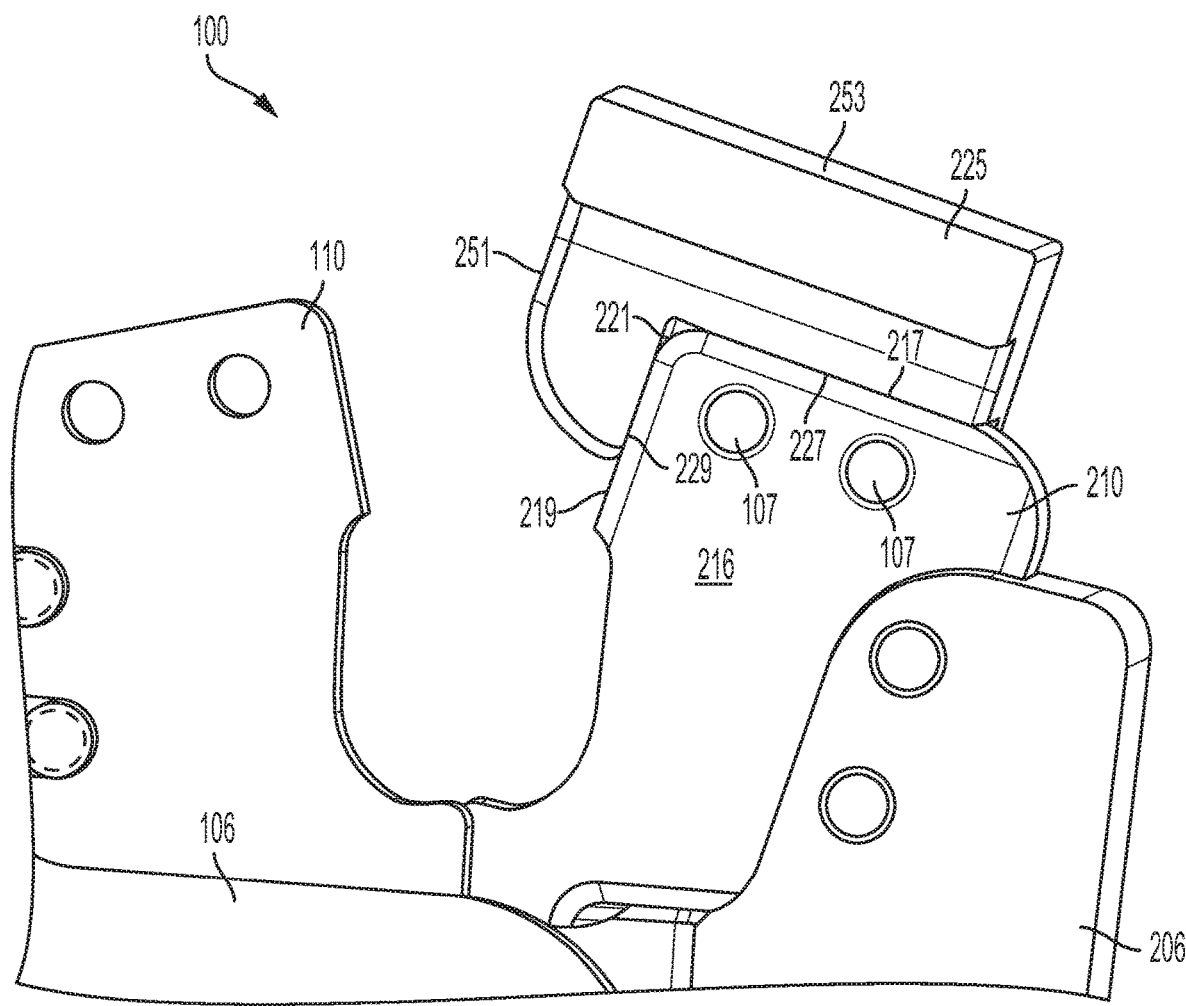
FIG. 8 is another sectioned view of a blade retainer, according to an example.

Referring to FIG. 8, the second shearing member 210 includes a first distal surface 217 and a second distal surface 219 that form a substantially right angle 221. In FIG. 8, a portion 291 (shown in FIG. 1B) of a blade retainer 225 (e.g., formed of metal) has been removed for clarity. The substantially right angle 221 can take the form of a gradual or rounded transition between the first distal surface 217 and the second distal surface 219 that are substantially perpendicular to each other. The first distal surface 217 and the second distal surface 219 are substantially perpendicular to the second lateral surface 216. The second shearing member 210 includes a third lateral surface 223 that is opposite the second lateral surface 216 (see FIGS. 2 and 6).

Referring to FIG. 1B, the shearing head 100 also includes an extension spring 218 configured to resist (i) separation of the first cam surface 108 and the second cam surface 208 and (ii) movement of the first shearing surface 112 toward the second shearing surface 212. The extension spring 218 can be fastened to the first actuation member 106 and to the second actuation member 206 respectively via fasteners 289.

Figure 2:
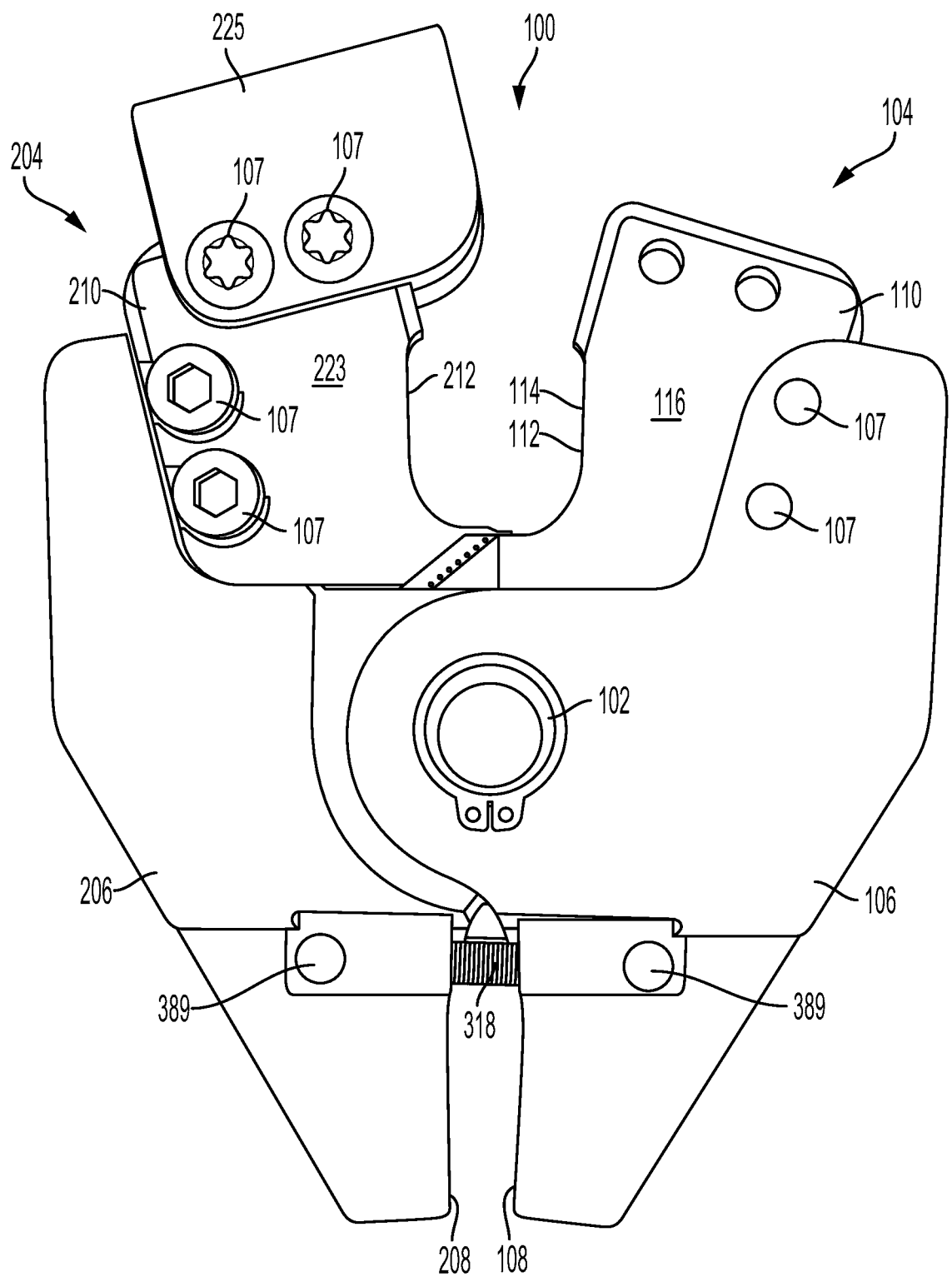
FIG. 2 is a rear view of a shearing head, according to an example.

Referring to FIG. 2, the shearing head 100 also includes an extension spring 318 configured to resist (i) separation of the first cam surface 108 and the second cam surface 208 and (ii) movement of the first shearing surface 112 toward the second shearing surface 212. The extension spring 318 can be fastened to the first actuation member 106 and to the second actuation member 206 respectively via fasteners 389.

Referring to FIG. 8, the shearing head 100 also includes the blade retainer 225 attached to the second shearing member 210 (e.g., via fasteners 107 and threaded holes within the second shearing member 210). The blade retainer 225 is configured, during a shearing action, to resist movement of the first shearing member 110 that is transverse to a shearing plane or movement of the second shearing member 210 that is transverse to the shearing plane. In FIG. 1B or FIG. 2, the shearing plane would be parallel to the paper.

Referring to FIG. 8, a first surface 227 of the blade retainer 225 fixedly contacts the first distal surface 217, a second surface 229 of the blade retainer 225 fixedly contacts the second distal surface 219, and the third lateral surface 223 of the second shearing member 210 (see FIG. 6) fixedly contacts a third surface 231 of the blade retainer 225. The blade retainer 225 can be attached to the second shearing member 210 via fasteners 107, for example. Typically, the first surface 227, the second surface 229, and the third surface 231 are orthogonal to each other.

As shown in FIG. 8, the blade retainer 225 advantageously extends beyond the second shearing member 210 in a direction parallel to the first distal surface 217 and in a direction parallel to the second distal surface 219. Thus, in the event a user drops the hydraulic power tool 10 such that a surface 251 or a surface 253 of the blade retainer 225 is impacted, the impact will be compressively absorbed by the second distal surface 219 and/or the first distal surface 217, thus preventing damage (e.g., breakage) to the fasteners 107 shown in FIG. 8.

Another advantage of the blade retainer 225 extending beyond the second shearing member 210 in the direction parallel to the first distal surface 217 is that the blade retainer 225 will engage the first shearing member 110 at an earlier stage of the shearing stroke than would otherwise be possible. This enables the shearing head 100 to shear wires or other workpieces having thicker diameters of hardened material (e.g., steel).

FIG. 2 is a rear view of the shearing head 100.

Figure 3:
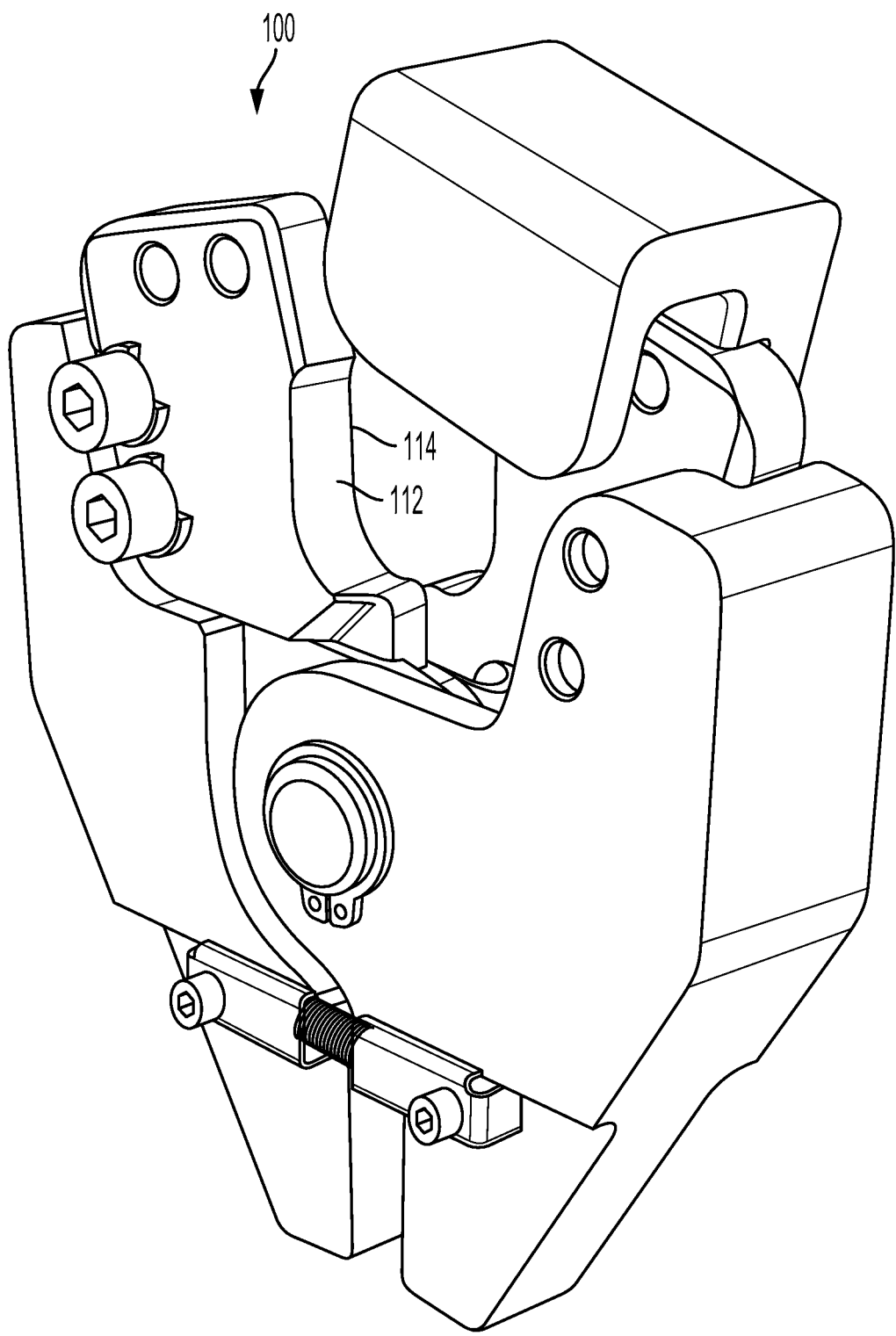
FIG. 3 is a perspective view of a shearing head, according to an example.

FIG. 3 is a perspective view of the shearing head 100. FIG. 3 shows the first shearing surface 112 and the first substantially right angle 114, among other features.

Figure 4:
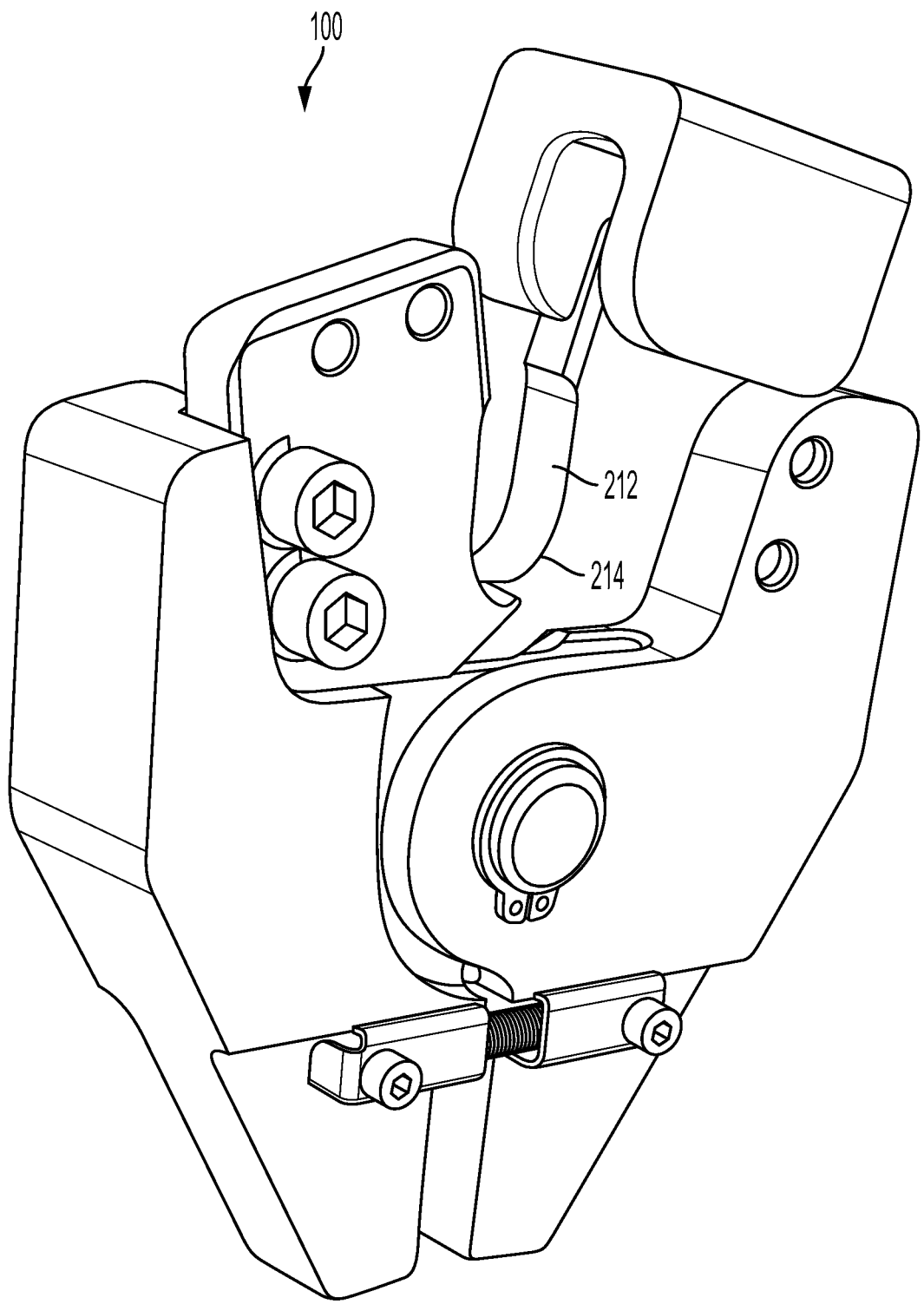
FIG. 4 is another perspective view of a shearing head, according to an example.

FIG. 4 is another perspective view of the shearing head 100. FIG. 4 shows the second shearing surface 212 and the second substantially right angle 214, among other features.

Figure 5:
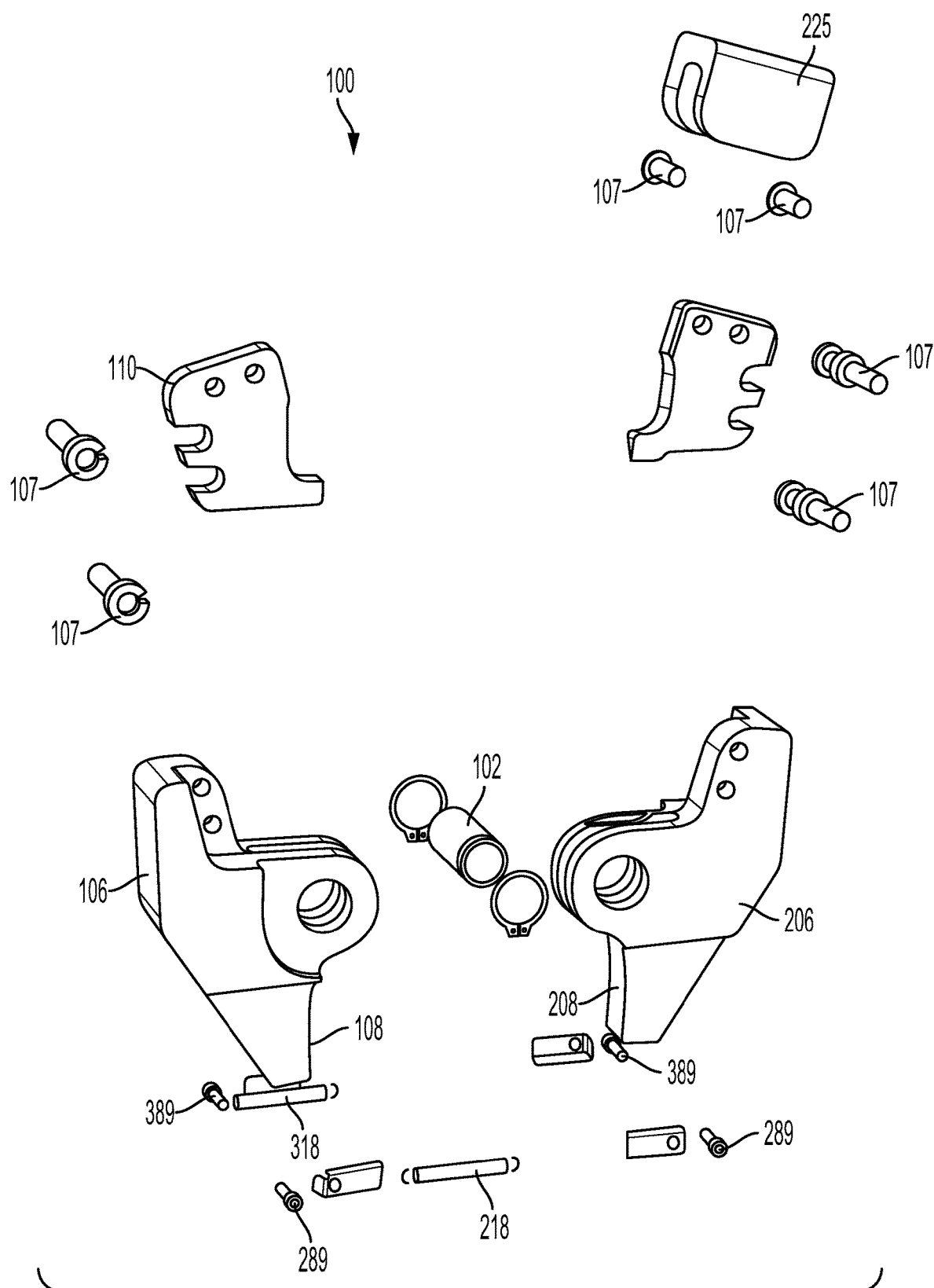
FIG. 5 is an exploded view of a shearing head, according to an example.

FIG. 5 is an exploded view of the shearing head 100.

Figure 6:
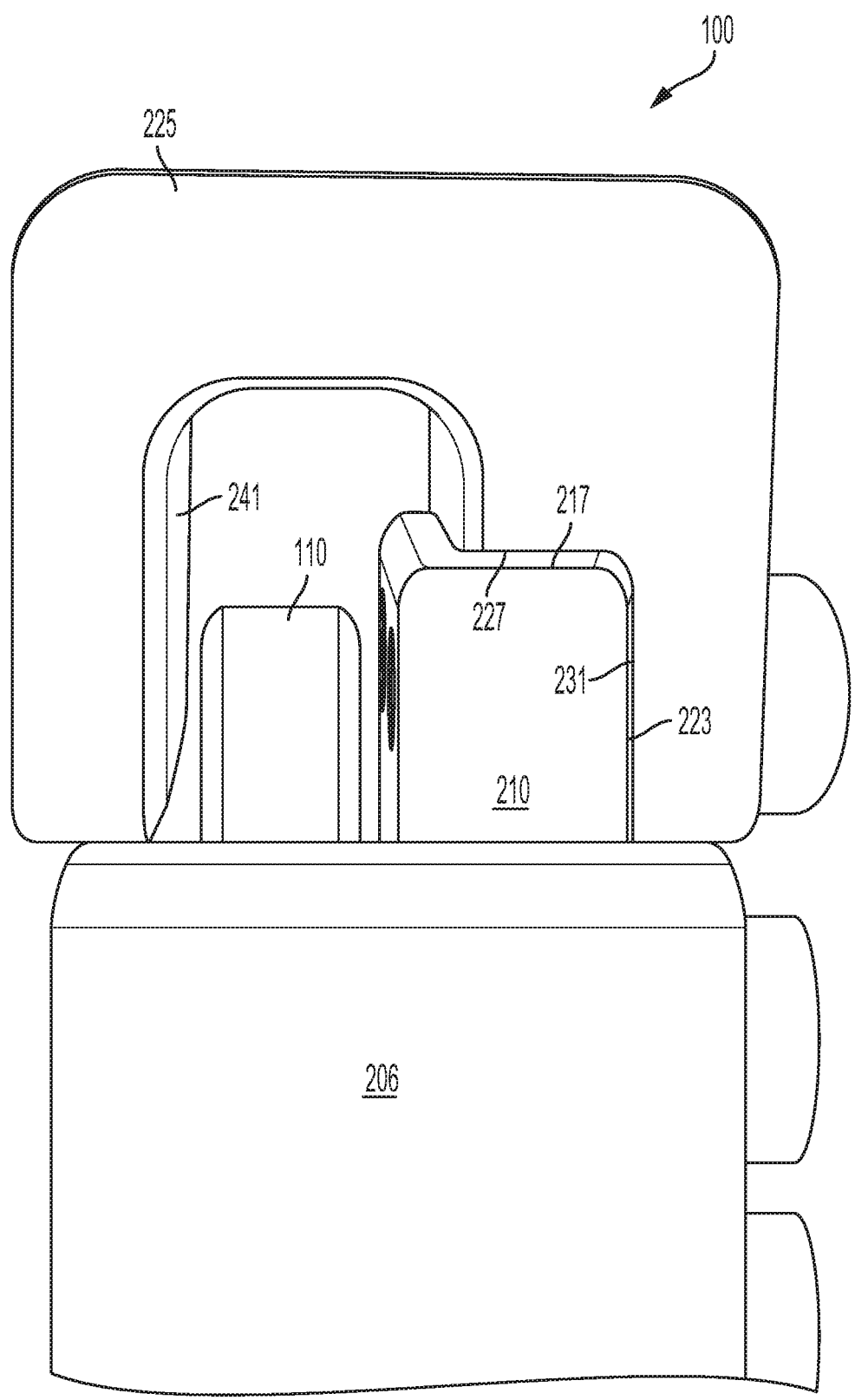
FIG. 6 is a close up view of a blade retainer, according to an example.

FIG. 6 is a close up view of the blade retainer 225. FIG. 6 shows how a surface 241 of the blade retainer 225 is configured to resist (leftward) motion of the first shearing member 110 that is normal to the shearing plane during a shearing operation. In FIG. 6, the shearing plane is vertically aligned with respect to the paper and extends into and out of the paper.

Figure 7:
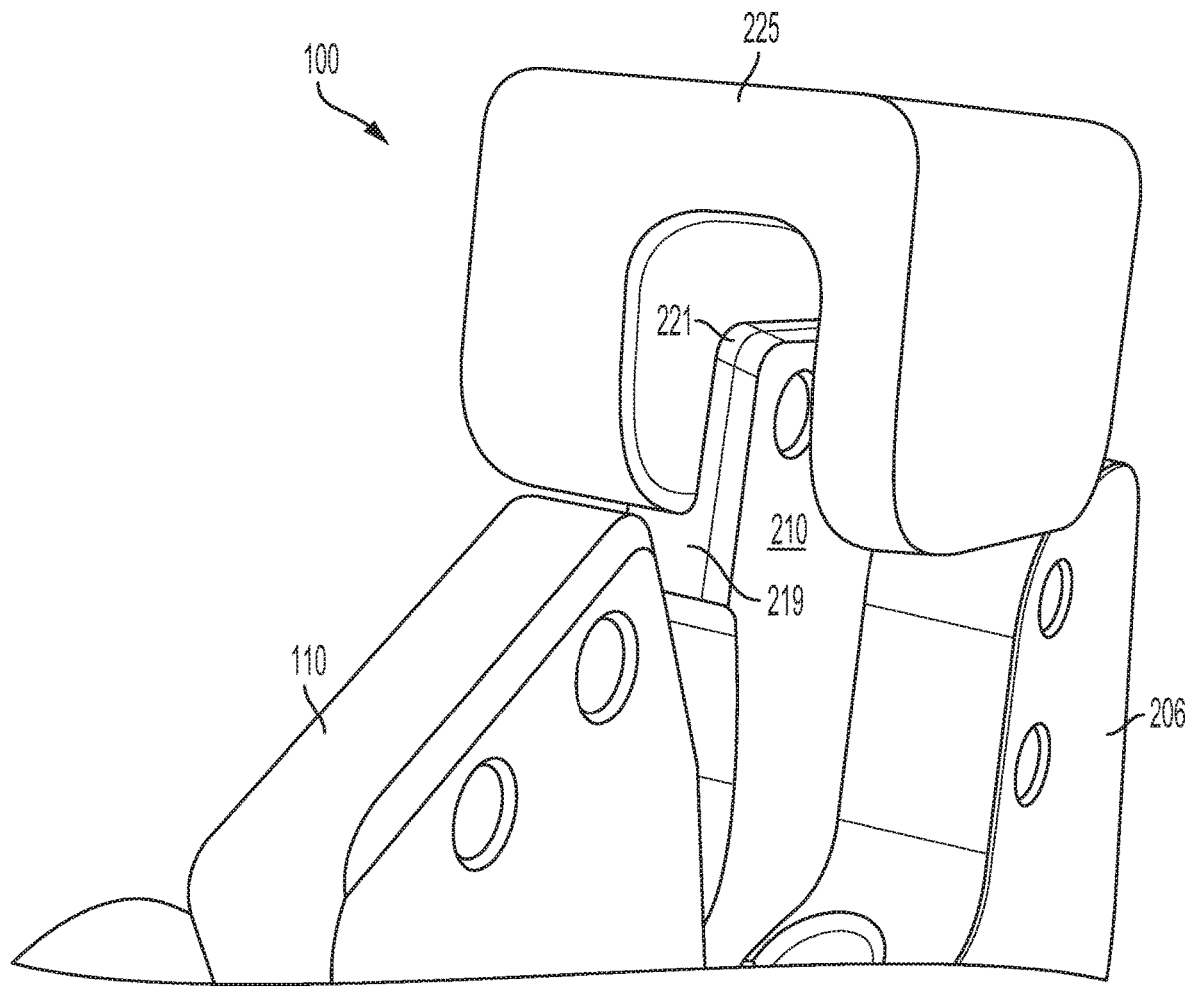
FIG. 7 is another close up view of a blade retainer, according to an example.

FIG. 7 is another close up view of the blade retainer 225.

FIG. 8 is another close up view of the blade retainer 225.

Figure 9:
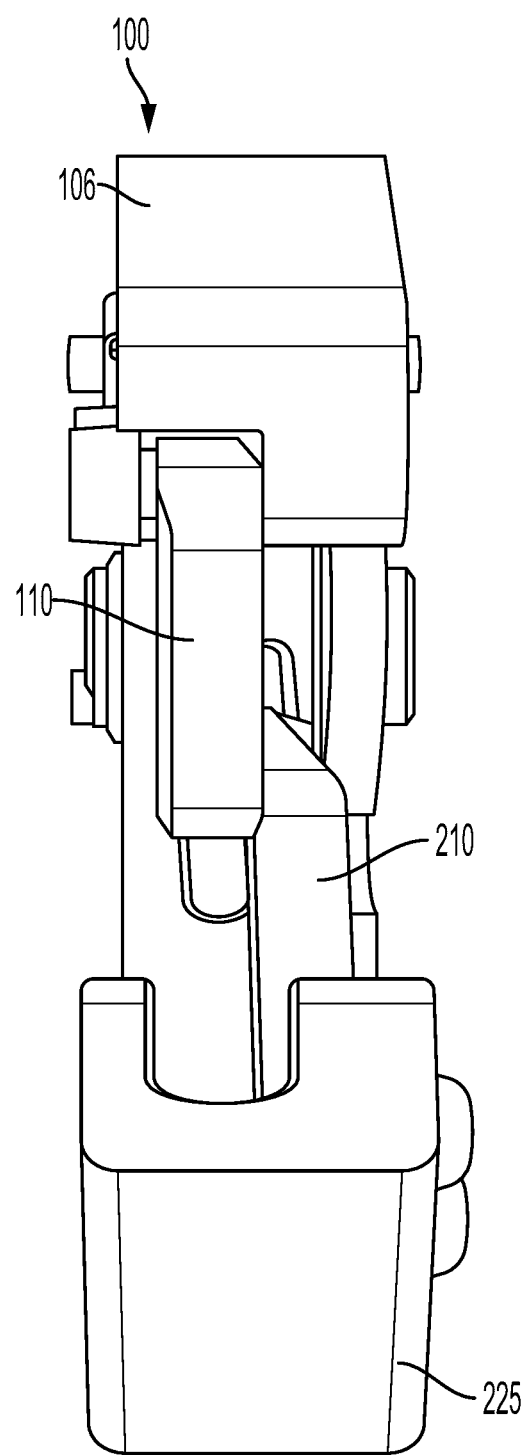
FIG. 9 is a top view of a shearing head, according to an example.

FIG. 9 is a top view of the shearing head 100.

Figure 10:
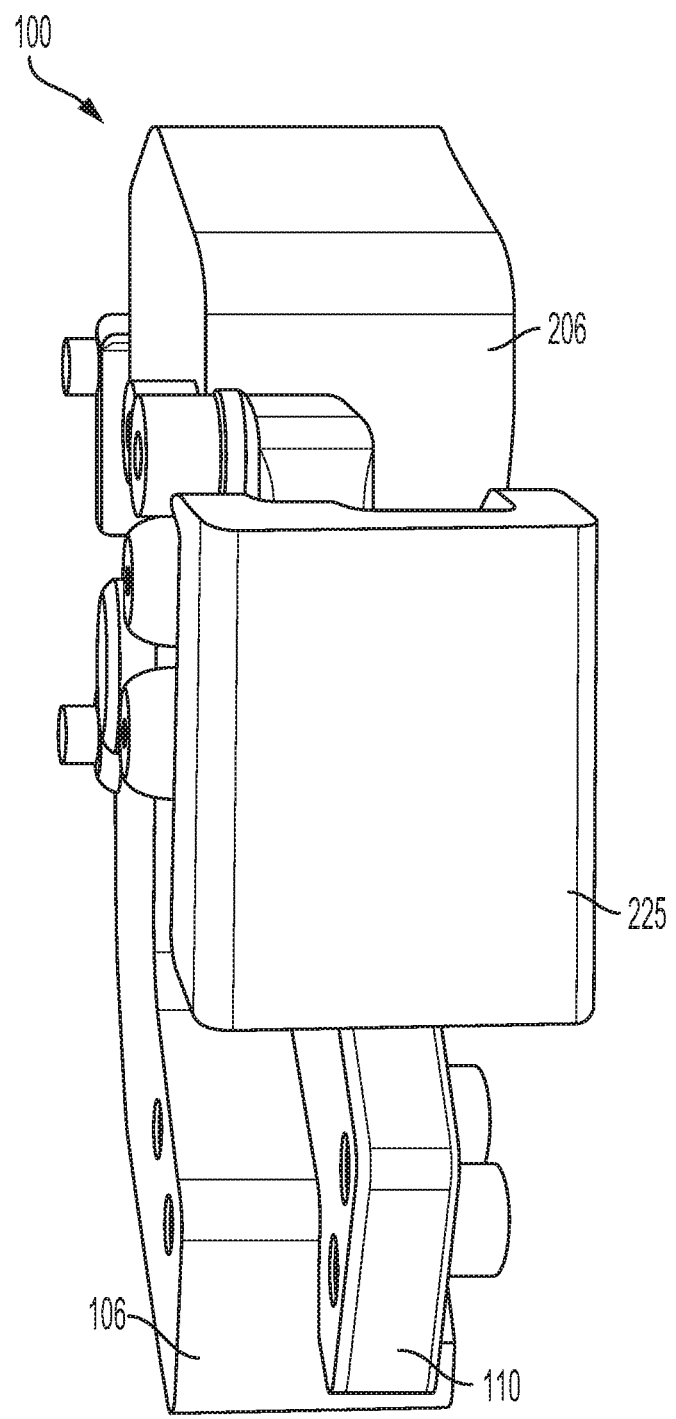
FIG. 10 is another top view of a shearing head, according to an example.

FIG. 10 is another top view of the shearing head 100.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A shearing head for a hydraulic power tool, the shearing head comprising:
   a first jaw that is rotatable with respect to an axis, the first jaw having a first shearing surface that forms a first angle with a first lateral surface of the first jaw;
   a second jaw that is rotatable with respect to the axis, the second jaw having a first distal surface, a second distal surface facing the first jaw and a second shearing surface, the second shearing surface forming that form a second angle with a second lateral surface of the second jaw; and
   a blade retainer attached to the second jaw, the blade retainer being configured, during a shearing action, to resist movement of the first jaw or the second jaw that is transverse to a shearing plane, the blade retainer including: having
   a first surface in contact with the first distal surface;
   a second surface in contact with the second distal surface of the second jaw: and
   a third surface in contact with a third lateral surface of the second jaw.

2. The shearing head of claim 1, wherein the first angle or the second angle is exactly 90 degrees.

3. The shearing head of claim 1, wherein the first shearing surface is parallel to the second shearing surface.

4. The shearing head of claim 1, wherein the first lateral surface faces the second lateral surface when the first jaw and the second jaw are closed.

5. The shearing head of claim 1, further comprising a pin that attaches the first jaw to the second jaw, wherein the first jaw and the second jaw are configured to rotate with respect to the pin.

6. The shearing head of claim 1, wherein the first jaw and the second jaw are biased open.

7. The shearing head of claim 1, further comprising an extension spring, wherein the first jaw and the second jaw are biased open via the extension spring.

8. The shearing head of claim 1, wherein the first jaw comprises:
   a first actuation member having a first cam surface, wherein the first jaw is configured to rotate in response to a first force being applied to the first cam surface; and
   a first shearing member having the first shearing surface and the first lateral surface, the first shearing member being attached to the first actuation member, and wherein the second jaw comprises:
   a second actuation member having a second cam surface, wherein the second jaw is configured to rotate in response to a second force being applied to the second cam surface; and
   a second shearing member having the second shearing surface and the second lateral surface, the second shearing member being attached to the second actuation member.

9. The shearing head of claim 8, further comprising a pin that attaches the first jaw to the second jaw, wherein the first jaw and the second jaw are configured to rotate with respect to the pin, and wherein the pin passes through the first actuation member and the second actuation member, proximate to the first shearing member and the second shearing member.

10. The shearing head of claim 8, further comprising an extension spring configured to resist (i) separation of the first cam surface and the second cam surface and (ii) movement of the first shearing surface toward the second shearing surface.

11. The shearing head of claim 1, wherein the blade retainer extends beyond the second jaw in a direction parallel to the first distal surface of the second jaw and in a direction parallel to the second distal surface of the second jaw.

12. The shearing head of claim 1, wherein the blade retainer is configured to engage the first jaw prior to the first jaw and the second jaw being positioned to both exert force upon a workpiece in a shearing zone between the first jaw and the second jaw.

13. The shearing head of claim 1, wherein movement of the first shearing surface toward the second shearing surface is configured to shear a workpiece into two pieces.

14. A shearing head for a hydraulic power tool, the shearing head comprising:
   a first jaw that is rotatable with respect to an axis; a second jaw that is rotatable with respect to the axis; and
   a blade retainer attached to the second jaw, the blade retainer being configured, during a shearing action, to resist movement of the first jaw or the second jaw that is transverse to a shearing plane, the blade retainer including: that has a first angle surface that conforms to a second angle surface of the second jaw,
a first surface of the blade retainer contacting a first distal surface of the second jaw,
a second surface of the blade retainer contacting a second distal surface of the second jaw, the second distal surface facing the first jaw, and
a third surface of the blade retainer contacting a second lateral surface of the second jaw.

15. The shearing head of claim 14, the first jaw having a first shearing surface that forms a first angle with a first lateral surface of the first jaw.

16. The shearing head of claim 14, wherein the blade retainer is configured to engage the first jaw prior to the first jaw and the second jaw being positioned to both exert force upon a workpiece between the first jaw and the second jaw.

17. The shearing head of claim 14, wherein the blade retainer extends beyond the second jaw in a direction parallel to the first distal surface of the second jaw and in a direction parallel to the second distal surface of the second jaw.

18. A method of using a hydraulic power tool having a cutting zone, the method comprising:
    placing a workpiece in the cutting zone between a first jaw of a shearing head and a second jaw of the shearing head, the first jaw having a first shearing surface that forms a first angle with a first lateral surface of the first jaw, and the second jaw having a second shearing surface that forms a second angle with a second lateral surface of the second jaw;
    causing the first jaw to rotate toward the second jaw, causing a blade retainer attached to the second jaw to engage the first jaw,
    the blade retainer in contact with a first distal surface of the second jaw, a second distal surface of the second jaw, the second distal surface facing the first jaw, and a lateral surface of the second jaw, the blade retainer configured to retain the first jaw; and
    causing the first shearing surface and the second shearing surface to begin shearing the workpiece.

* * * * *